United States Patent

[11] 3,594,557

| [72] | Inventor | James Spence Anderson |
| | | Norton-on-Tees, England |
| [21] | Appl. No. | 680,729 |
| [22] | Filed | Nov. 6, 1967 |
| [45] | Patented | July 20, 1971 |
| [73] | Assignee | Imperial Chemical Industries Limited |
| | | London, England |
| [32] | Priority | Nov. 18, 1966 |
| [33] | | Great Britain |
| [31] | | 51,841/66 |

[54] METHOD FOR THE AUTOMATIC CONTROL OF A PROCESS VARIABLE
3 Claims, 1 Drawing Fig.

[52] U.S. Cl. .................................................. 235/151.1,
235/151.12, 317/36, 322/18, 328/1, 328/135,
340/237, 340/239
[51] Int. Cl. ..................................................... G06g 7/57,
G08b 23/00
[50] Field of Search ....................................... 235/183,
150.4, 151.1, 151.12; 328/127, 133, 1—6, 156,
135; 340/173, 147, 237, 248, 258, 222, 239, 421;
318/18, 565, 610, 623; 260/687; 307/92, 93, 141;
322/18

[56] References Cited
UNITED STATES PATENTS

| 3,258,762 | 6/1966 | Donner | 340/258 X |
| 3,350,703 | 10/1967 | Johnson | 340/248 X |
| 3,465,339 | 9/1969 | Marner | 340/248 X |
| 3,482,234 | 12/1969 | Doniger et al. | 340/248 X |
| 2,946,943 | 7/1960 | Nye et al. | 318/18 X |
| 3,435,194 | 3/1969 | Peschon et al. | 235/183 X |
| 3,443,074 | 5/1969 | Schmid | 235/150.4 |

OTHER REFERENCES

Russell et al.: "The Analog Computer As A Process Controller"
CONTROL ENGINEERING Sept. 1957 pages 160— 165

*Primary Examiner*—Malcolm A. Morrison
*Assistant Examiner*—Felix D. Gruber
*Attorney*—Cushman, Darby & Cushman

ABSTRACT: The invention is drawn to a method for the automatic control of a process variable particularly a hazardous variable such as the flow rate of an inflammable gas, e.g. oxygen. Signals representing the variable are fed to a computer whereby they are lagged before being compared with subsequent signals. The difference between the lagged and unlagged signals may then be compared with a fixed signal representing a preset critical value to the variable. When this latter value is exceeded remedial action is taken. Preferably the lagged signal is emitted in exponential form, so permitting controlled increases in the variable to be made more readily. The invention is of particular use in systems involving gas recirculation in which an accidental increase in gas flow rate is magnified by the recirculation system.

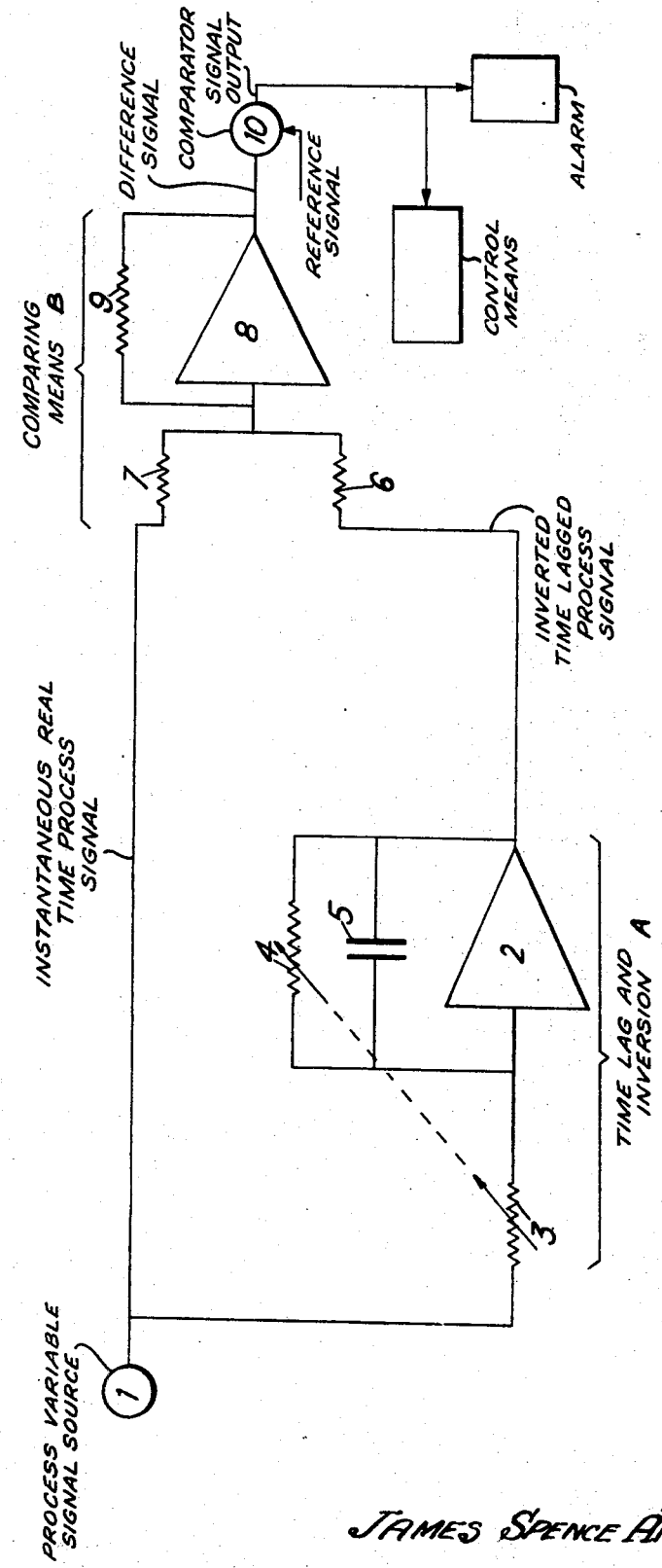

METHOD FOR THE AUTOMATIC CONTROL OF A PROCESS VARIABLE

The present invention relates to an automatic method of controlling a process variable and to an apparatus for carrying out the method.

In many industries, particularly the chemical industry, it is necessary to control a variable in a process, for example the flow of reactants to the process, the temperature of the process, or the pressure existing in the reaction zone. In general this control may be exercised automatically by measuring a variable using a detecting element, feeding the measured value to an automatic controller and, when the measured value differs from a desired value, feeding a message from the controller to a correcting unit. The correcting unit may influence the measured variable directly, e.g. a flow rate value may be adjusted by a change in flow, or it may influence the measured variable indirectly, e.g. a temperature may be adjusted by a change in the rate at which a coolant is fed to the process. The detecting elements used are commonly flow indicators, pressure indicators, thermometers, etc. The measured value may be fed to the controller by means of an electrical signal, pneumatically, e.g. by compressed air or other inert gas, or hydraulically. The correcting unit may be, for example, a valve controlling the flow of a fluid or a switch controlling the supply of electricity.

A problem closely associated with the control of a variable is the provision of an alarm system if the variable undergoes a sudden and unexpected change. Usually it is desired to provide an alarm which will not come into operation in response to minor fluctuation in the variable or in response to slow and deliberate alterations in the variable by the process operator but will still provide an alarm and/or take correcting action if a significant and unplanned change takes place. An object of the method and apparatus of the present invention is to provide such an alarm system.

In the following discussion reference is made to control of fluid flow in which the detecting element is a flowmeter. This is by way of example, and the detecting element could equally well measure temperature or another variable and the control could similarly be exercised on another variable such as electric current. An alarm device is described in which the fluid flow is cut off in response to a control. However, the fluid flow could equally well be merely diminished or even increased depending on the circumstances in the plant concerned.

In one known method of control, a flow controller has a set point above which the fluid flow is automatically cut off. This method however is inflexible, for the cutoff value must be increased or decreased by the operator if it is desired to increase or decrease the flow and it is possible when reductions in flow rate are made to inadvertently leave the cutoff set at a too high value. An alternative method, applicable when the fluid is a reactant in a process, is to measure the concentration of unreacted fluid in the reactor and to cut off the fluid flow to the reactor if the concentration rises above a preset figure. This method is particularly applicable to a continuously operating process in which the concentration of unreacted fluid can be measured in the product stream leaving the reactor. The method suffers from the disadvantage however that by the time the excess fluid is detected in the product stream the concentration in the reactor is also unduly high and a hazardous condition may have been set up. This is particularly likely to occur in a reactor having a large reaction space.

We have now found a method of automatically controlling a process variable which is capable of altering the variable in response to a significant and unplanned change in the variable but which is self-adjusting to slow changes in the variable.

According to the invention a method for the automatic control of a process variable comprises continuously measuring the variable, and continuously feeding signals representing the measurements to a computer which has been adapted to compare each signal with a lagged signal or signals representing a previously measured value or values of the variable and to modify the variable or actuate an alarm when a preset difference occurs between the compared values.

The computer may function in two ways. In the first the computer produces a lag or time delay in any given signal and then compares this lagged value with a subsequent measured signal. The time period between the lagged signal and the measured signal (in other words, the lag) is a function of the computer and capable of being set by the operator. In this instance therefore each measured signal is compared with a signal representing a previous measurement of the variable. Alternatively and preferably, the time delay or lag in a signal is produced by passing the signal representative of the measurement through a first order exponential lag and comparing the output signal from the lag with a subsequent input signal. Thus in the case of a timelag alone a sharp change in the measured signal is reproduced as such after the preset timelag, whereas when the lagged signal is in the form of an exponential, change in signal strength follows a curve approaching its maximum value asymptotically. The rate at which the lagged signal strength changes in response to a given change in the input signal is related to the time constant of the computer element concerned and can be adjusted at will. In practice it is preferred to adjust the computer so that a step increase in the input produces a lagged signal reaching about 60 percent of its maximum value in up to 20 minutes, more preferably between 5 and 15 minutes.

The difference, be it an increase or decrease, between the measured and lagged signals at which the variable is modified or the alarm is actuated may be chosen by reference to the system in which the method of the present invention is to be used. The difference should be such that no response is made to slow controlled increases or decreases in input signal strength but that action is initiated if a sudden significant increase or decrease takes place.

As described above the variable may be any process variable but in particular it may be a gas or liquid flow rate, the method being specially applicable to an inflammable, toxic or explosive gas. Thus the gas may be oxygen or a hydrocarbon or hydrocarbon derivative, for example ethylene, propylene, ethylene oxide or propylene oxide. An especially important use of the present method is in the control of the oxygen supply to a continuous oxidation process, for example a process for the continuous oxidation with oxygen of a gaseous olefine such as ethylene. One such oxidation is described in British Pat. Specification No. 964,001. A further significant application of the present method is in continuous processes in which part of the gas to be controlled is recirculated from the reactor. In this case it is even more important that sudden increases in the gas flowrate should be detected and corrected as the recirculation enhances the gas concentration in the reaction system. Conversely the gas, the flow of which is to be controlled, may be an inert diluent, for example nitrogen, argon or steam, being fed to a process and in this instance it may be important that the rate of gas flow does not fall below a preset value. The method of the present invention may be used to control automatically the flow of such a diluent or to indicate to an operator the need for corrective action.

An apparatus suitable for use in the method of the present invention comprises a circuit adapted to be operatively connected to a detecting element and comprising means for delaying a signal received from said detecting element, means for comparing a signal or signals emitted by said delaying means with the signal received from said detecting element, and means for emitting a correcting signal only when the difference between the compared signals exceeds a predetermined value (which may, if desired, be zero).

The computer may be operatively connected to a correcting unit, to give an alarm or to modify, directly or indirectly, the value of the process variable, in response to any correcting signal emitted by the computer.

As described above, the detecting element which continuously or intermittently detects the value of a process variable may for example measure rate of flow (a flowmeter), pressure or temperature (a thermometer or thermocouple). The correcting unit may be for example a valve or an electric switch or a device for giving audible or visual alarm. The detecting element and correcting unit may be connected to the computer by electrical, pneumatic or hydraulic means.

The delaying means may comprise an integrator in which the output signal is fed back to the input, so producing a signal in exponential form when any change takes place in the measured variable. It is generally advantageous to reverse the sign of the signal emitted by the lag unit so that the means for comparing the signals (the "difference unit") may act as a summer, i.e. the signal emitted by the lag unit is added to the signal representing the measured variable. Under steady conditions therefore the output of the difference unit is zero. Especially when the signal emitted by the difference unit is to operate an alarm or to initiate emergency corrective action the difference signal may be compared with a fixed imposed signal representing the predetermined critical value. Then only when this value is exceeded will the alarm function.

When the apparatus is used to control a maximum value of a variable, it is possible that a condition may occur in which the variable is deliberately reduced by the plant operator. There will then occur a period, due to the lag, during which the reduced signal will be compared with the unchanged signal. If a large inadvertent increase in the variable takes place in this period, the increase may remain undetected and a dangerous condition may be set up before the deliberately reduced signal passes through the lag and is compared with the now increased signal being received. To avoid this occurrence it is desirable to provide means to alter the magnitude of the lagged signal quickly in the required direction, i.e. to reduce it for a "maximum" alarm or to increase it for a "minimum" alarm. This may be achieved by providing means for applying an input voltage to the integrator, when the difference unit is set to operate with normally a zero output as described above. The effect of the input voltage is to reduce the signal emitted by the integrator and so restore the output of the difference unit to approximately zero once again. The input voltage is removed when the delaying means has responded to the change made by the plant operator.

One form of the invention will now be described with reference to the accompanying circuit drawing.

A lag unit A (timelag and inversion means) receives an input signal from a flowmeter 1. The lag unit comprises a high gain DC amplifier 2, an input resistance 3, a feedback resistance 4 and a feedback capacitor 5. The output side of the lag unit A is connected via a resistance 6 to a difference unit B which is also linked to the flowmeter directly via resistance 7. The difference unit comprises a high gain DC amplifier 8 and resistance 9 operating as a comparing means. The output of the difference unit is connected to a comparator unit 10 which also receives a signal of fixed preset value.

In operation, signals received from the flowmeter are transmitted to the lag unit A and the difference unit B. The output of the lag unit is equal to the input to the lag unit under steady conditions but in response to a step increase in flow an increase takes place in the signal emitted by the lag unit, the increase being in first order exponential form. The output signal from the lag unit is reversed in sign and is summed in the difference unit with the flowmeter signal received direct via resistance 7. The output of the difference unit is compared in the unit 10 with the fixed signal representative of the critical flow rate. When the output of the difference unit exceeds this fixed signal, the unit 10 actuates an alarm.

To put the apparatus into critical two factors need to be decided. These are the critical value at which the correcting unit is to be actuated and the time constant required of the circuit. The critical value may be known per se or may be calculated from a knowledge of the effect of changes in the required of the circuit may also be calculated and may take into account both a step and a ramp increase in the variable and in its associated signal.

An example of the method of setting up the apparatus is as follows. By means of a plant trial it was determined that a ramp increase in a variable of 100 units per minute would give rise to a hazardous condition after a time of 5 minutes. It was also determined that the maximum tolerable step increase in the variable was 400 units. The critical value at which the correcting unit was to be actuated and the time constant of the computer were calculated to be 394 units and 10 minutes respectively.

I claim:

1. In a self-adjusting process control and monitoring apparatus, the method of automatically controlling and monitoring a controlled process variable which permits the process variable to undergo relatively slow changes during a normal process cycle without producing an output control signal but which results in an appropriate output control signal when abnormal rapid changes in the variable occur, said method comprising the steps of:

generating a process output signal representing at least one controlled process variable, generating a timelagged signal by effectively delaying said process output signal for a predetermined time period, comparing said process output signal with said timelagged signal to produce a difference signal representing the difference therebetween whereby said difference signal approaches zero in the absence of any further change in said process variable after said predetermined amount of time delay to result in self-adjustment to any new operating level for said process variable, presetting said predetermined amount of time delay to cause said difference signal to be relatively small when the process signal is undergoing relatively slow changes during a normal process cycle and to be relatively large when abnormal rapid changes in said process variable occur, providing a preset reference signal, and comparing said difference signal with said preset reference signal to produce a control signal if said difference signal is relatively large thereby indicating abnormal rapid changes in said process variable.

2. A method as in claim 1 comprising the added step of:

applying said control signal to a correcting means for modifying the value of the process variable in response to said control signal.

3. A method as in claim 1 comprising the added step of:

applying said control signal to an alarm means to cause an alarm to be given in response to said control signal.